(12) United States Patent
Ganesh et al.

(10) Patent No.: US 10,296,520 B1
(45) Date of Patent: May 21, 2019

(54) SOCIAL NETWORK ANALYSIS OF FILE ACCESS INFORMATION

(71) Applicant: Veritas Technologies LLC, Mountain View, CA (US)

(72) Inventors: Anantharaman Ganesh, San Jose, CA (US); Michael Andrew Hart, Brooklyn, NY (US)

(73) Assignee: Veritas Technologies LLC, Mountain View, CA (US)

( * ) Notice: Subject to any disclaimer, the term of this patent is extended or adjusted under 35 U.S.C. 154(b) by 1131 days.

(21) Appl. No.: 14/108,154

(22) Filed: Dec. 16, 2013

Related U.S. Application Data (60) Provisional application No. 61/858,055, filed on Jul. 24, 2013.

(51) Int. Cl.
| | |
|---|---|
| *G06F 16/20* | (2019.01) |
| *G06F 16/28* | (2019.01) |
| *G06F 17/30* | (2006.01) |
| *G06F 16/901* | (2019.01) |
| *G06F 16/176* | (2019.01) |
| *G06F 16/335* | (2019.01) |

(52) U.S. Cl.
CPC ......... *G06F 16/285* (2019.01); *G06F 16/176* (2019.01); *G06F 16/335* (2019.01); *G06F 16/9027* (2019.01); *G06F 17/30598* (2013.01)

(58) Field of Classification Search
CPC ......... G06F 17/30958; G06F 17/30961; G06F 17/30994; G06F 17/30274; G06F 17/3053; G06F 17/30572; G06F 17/30699; G06F 17/30867; G06F 16/335; G06F 16/285; G06F 16/9027; G06F 16/904
USPC .................................... 707/736, 737
See application file for complete search history.

(56) References Cited

U.S. PATENT DOCUMENTS

| | | | | |
|---|---|---|---|---|
| 5,937,428 | A * | 8/1999 | Jantz | G06F 3/061 |
| | | | | 710/37 |
| 8,386,486 | B2 * | 2/2013 | Zhang | G06Q 30/02 |
| | | | | 382/111 |
| 8,626,835 | B1 * | 1/2014 | Gyongyi | G06F 17/30598 |
| | | | | 709/204 |
| 9,229,942 | B1 * | 1/2016 | MacNeill | G06F 11/1458 |
| 9,251,157 | B2 * | 2/2016 | Frieden | G06F 17/30144 |
| 2006/0067213 | A1 * | 3/2006 | Evans | H04L 45/00 |
| | | | | 370/229 |
| 2008/0086511 | A1 * | 4/2008 | Takao | G06F 17/30265 |
| 2009/0150390 | A1 * | 6/2009 | Morimoto | G06F 17/30675 |
| 2010/0005105 | A1 * | 1/2010 | Zhang | G06Q 30/02 |
| | | | | 707/E17.021 |
| 2014/0164080 | A1 * | 6/2014 | Thompson, Jr. ... | G06Q 30/0214 |
| | | | | 705/14.16 |

(Continued)

*Primary Examiner* — Srirama Channavajjala
*Assistant Examiner* — Fariborz Khoshnoodi
(74) *Attorney, Agent, or Firm* — Patent Law Works LLP (57) ABSTRACT

An analyzer module may identify a plurality of users and a plurality of files that have been accessed by at least one of the users. Pairs of users may be identified where each user of a pair has accessed at least one same file. A weight value may be calculated for each of the identified pairs. The weight value may be calculated based on a number of same files that each of the users of an identified pair have accessed. Collaboration information associated with the users may be determined based on the weight values.

20 Claims, 7 Drawing Sheets

(56) References Cited

U.S. PATENT DOCUMENTS

2014/0337965 A1* 11/2014 Savini ................ H04L 63/0272
726/15

* cited by examiner

SOCIAL NETWORK ANALYSIS OF FILE ACCESS INFORMATION

RELATED APPLICATIONS

This patent application claims the benefit under 35 U.S.C. § 119(e) of U.S. Provisional Application No. 61/858,055 filed Jul. 24, 2013, which is herein incorporated by reference.

TECHNICAL FIELD

The present disclosure relates to file access information, and more particularly, social network analysis of file access information.

BACKGROUND

A large enterprise may routinely work with significant amounts of data. For example, a corporate enterprise may provide a network file system that stores many files organized throughout many folders of a file structure hierarchy. The files of the network file system may also include many different types of data including structured and unstructured data. Furthermore, thousands of users may have access to the network file system and each of the users may use the network file system in different ways. For example, a user of an engineering group in the corporate enterprise may access engineering files while users of a marketing group within the same corporate enterprise may only seek to access marketing files in the network file system.

A network administrator may be responsible to manage and oversee the network file system. Such responsibilities may include complying with auditing regulations, setting file access permissions for users of the corporate enterprise, and securing the files of the network file system as required by corporate policies. However, such tasks may be burdensome to the network administrator who is responsible for a large network file system that includes a substantial number of files and users, various types of unstructured files, and a complex file structure hierarchy. For example, with such a complex network file system, it may be difficult for the network administrator to determine which users should have access to which types of files in the network file system or to identify anomalous or unauthorized activity on the network file system.

BRIEF DESCRIPTION OF THE DRAWINGS

The present disclosure will be understood more fully from the detailed description given below and from the accompanying drawings of various implementations of the disclosure.

SUMMARY

Information identifying a plurality of users and a plurality of files that have been accessed by at least one of the users may be received. Pairs of users may be identified based on each user of the pair accessing at least one same file of the plurality of files. A weight value may be calculated for each of the identified pairs of users based on a number of same files that have been accessed by each user of each identified pair. Collaboration information associated with the users may be determined based on the weight value for each of the identified pairs.

In some embodiments, the identifying of the pairs of users may further be based on each user of the pair accessing at least one file under a same folder.

In some embodiments, the calculating of the weight value for each of the identified pairs may further be based on a frequency of access of the same files that have been accessed by each user.

In some embodiments, a graph is generated to represent the collaboration information. The graph may comprise a plurality of nodes and links. Each node may correspond to one of the users and each link may connect two of the nodes corresponding to users of each identified pair.

In some embodiments, the nodes of the graph may be clustered into a plurality of groups based on the weight value for each of the identified pairs and the links between the nodes corresponding to users of each of the identified pairs.

In some embodiments, collaborative groups of users may be identified based on the nodes clustered into the groups. Furthermore, an outlier user may be identified based on the nodes clustered into the groups and the links between the nodes.

In some embodiments, the calculating of the weight value for each of the identified pairs may further be based on a type of access to the same files by each user. A write access to at least one of the same files may result in a higher weight value than a read access to at least one of the same files.

DETAILED DESCRIPTION

Described herein are a method and apparatus for social network analysis of file access information. A social network analysis may involve identifying relationships or associations between two or more users. For example, in a network file system, a social analysis of users of the network file system may identify relationships or associations between the users who access files stored in the network file system. Such identified relationships or associations may be used to identify collaborative information associated with the users.

A relationship or association between users of a network file system may be based on a common or similar file access between users who access files stored in the network file system. A network file system may include a significant number of files organized in a hierarchy of folders. As users access (e.g., read, write, open, edit, copy, etc.) files stored in the network file system, a log file may be updated to include information associated with the access of the files by the users. A network administrator may be responsible for managing and overseeing the network file system. Implementations of the present disclosure may include an analyzer module, which is described in further detail below, to identify relationships or associations between users by using the log file. Such identified relationships or associations may be considered collaboration information and may facilitate the managing and overseeing responsibilities of the network administrator. The identification of the relationships or associations between users may lead to the identification of collaborative groups of users and user roles within an organization, detection of anomalous or unauthorized file access behavior, improvement in file access permissions for users of the network file system, and further analysis of files that users are collaborating upon. The features of the analyzer module, which are described in further detail below, may include an analyzer sub-module, log file data, a graph generator sub-module, a clustering sub-module, a calculator sub-module, and a console sub-module.

Figure 1:
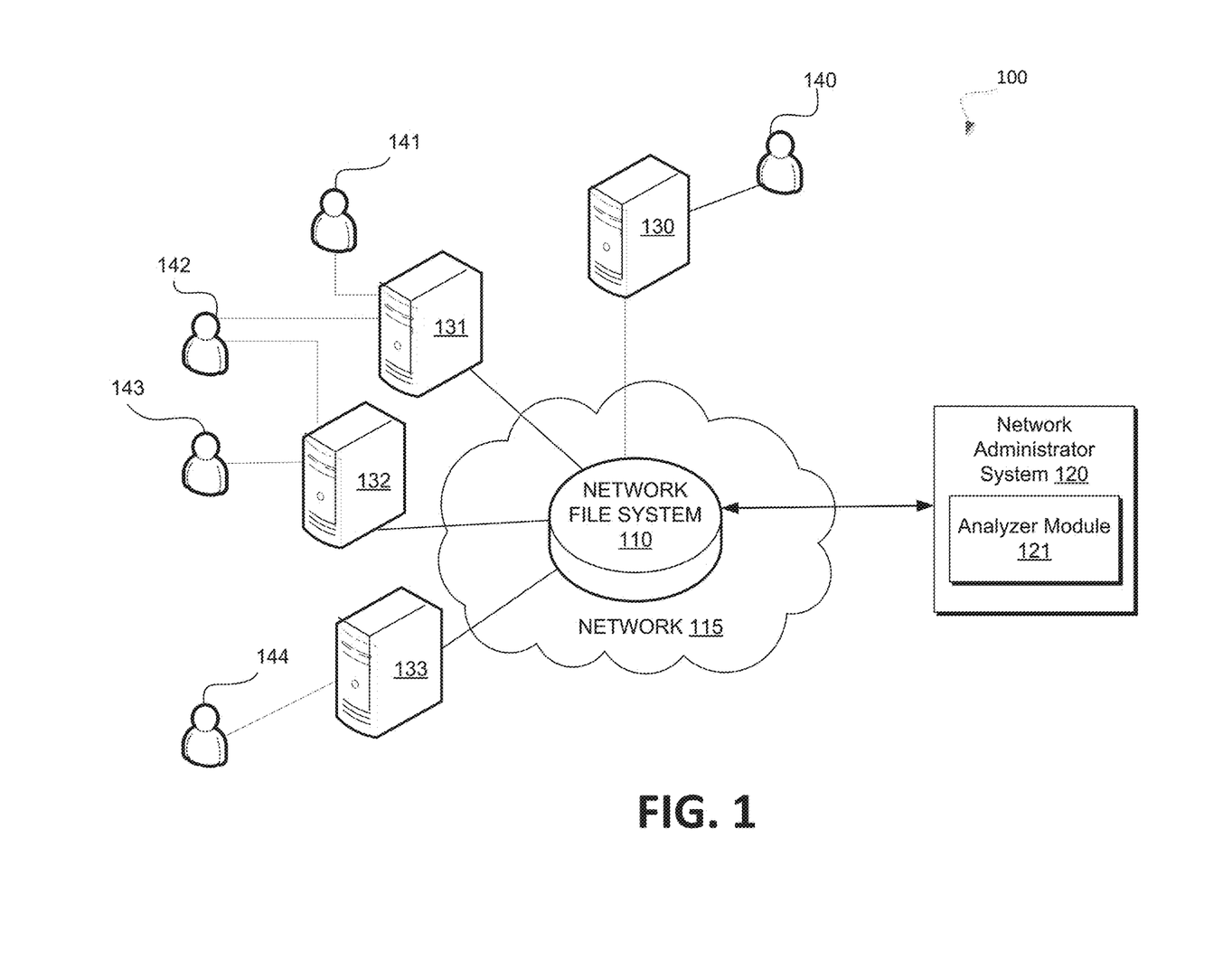
FIG. 1 illustrates an example system architecture in accordance with various implementations.

FIG. 1 illustrates an example system architecture 100 for various implementations. The system architecture 100 may include one or more computing devices 130, 131, 132, and/or 133, one or more network file systems 110, and one or more network administrator systems 120 coupled to each other via a network 115. The network 115 may be a public network, a private network, a wireless network, a cellular network, or a combination thereof.

A network file system 110 may be a type of data or file storage service that provides file storage and file access services to users 140, 141, 142, 143, and/or 144 of computing devices 130, 131, 132, and/or 133. A computing device may be a desktop computer, laptop computer, portable computing device such as, but not limited to, mobile telephones, personal digital assistants (PDAs), portable media players, netbooks, tablet computers, portable gaming console, portable television, an electronic book reader, and the like. As shown, one or more users may use the computing devices 130, 131, 132, and/or 133 to remotely access the network file system 110. For example, the user 142 may access the network file system 110 by using either computing device 131 or 132.

The network file system 110 may allow users of the computing devices 140, 141, 142, 143, and/or 144 to access one or more files stored in association with the network file system 110. In some embodiments, the network file system 110 may be a file storage server associated with a large number of stored files that may be remotely accessed by the computing devices. The files stored in the network file system 110 may be organized under a hierarchy of folders (also referred to as directories). A root folder may be considered the first or top-most folder. Files and additional folders (i.e., sub-folders) may be organized under the root folder. Furthermore, additional files and folders may be organized under sub-folders. The users 140, 141, 142, 143, and/or 144 of the computing devices may thus access the same file in the hierarchical organizational structure of the network file system 110 and/or may access files that are organized under the same folder. Such files that are organized or located under a same folder may be referred to as similar files.

The network file system 110 may be associated with and/or store files of a corporate enterprise. Employees of the corporate enterprise may be users of the network file system 110. For example, employees in an engineering department may collaborate with each other by working on the same or similar files and employees in a marketing department may similarly collaborate with each other by working on the same or similar files as other employees within the same department. The system architecture 100 may include one or more network administrator systems 120 to provide an analyzer module 121 to provide a social network analysis of the network file system 110 by identifying relationships or associations between the users. For example, relationships between engineering department employees may be identified, by the analyzer module 121, based on users who have accessed engineering related files while relationships between marketing department employees may be identified based on users who have accessed marketing related files.

As such, the analyzer module 121 may receive or record a log file that includes information about which users have accessed which files on a network file system. The analyzer module 121 may identify relationships or associations between users from the log file. In some embodiments, the analyzer module 121 may further create a graph and perform hierarchical clustering to visually display a graph representing the relationships or associations between users, as is discussed in further detail below.

Figure 2:
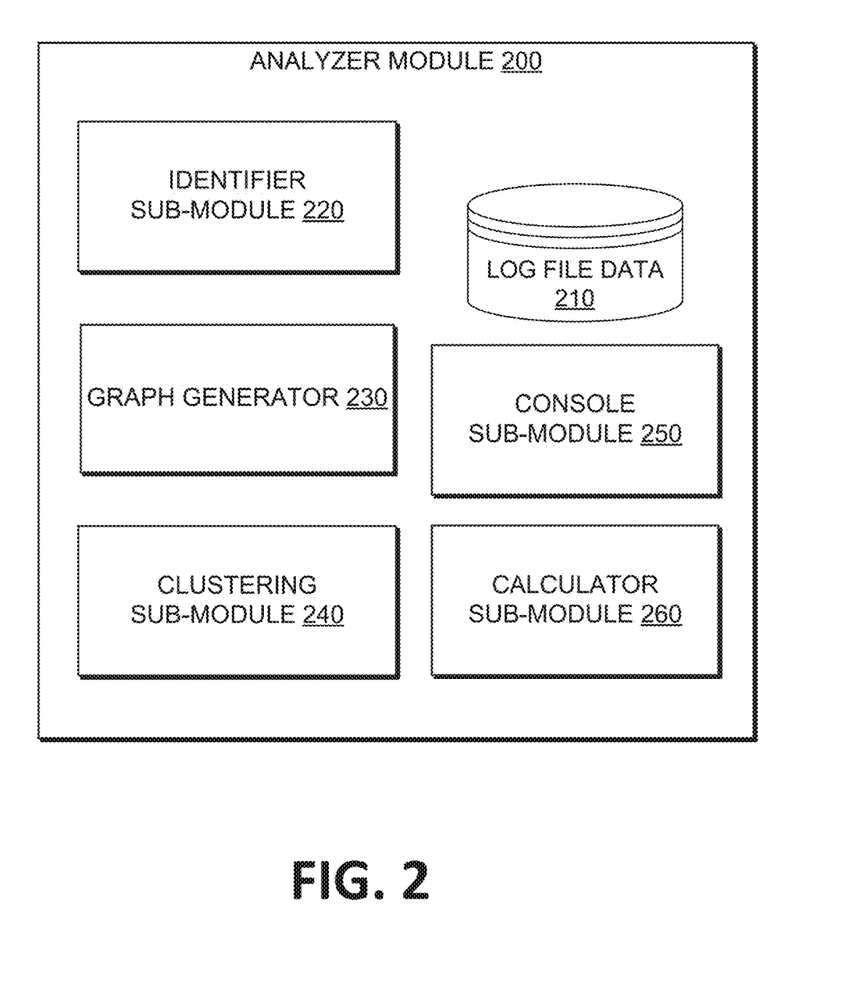
FIG. 2 is a block diagram of an example of an analyzer module in accordance with some embodiments.

FIG. 2 is a block diagram of an example analyzer module 200 in accordance with some embodiments. In general, the analyzer module 200 may correspond to the analyzer module 121 in a network administrator system 120 as shown in FIG. 1. The analyzer module 200 may include a log file data sub-module 210, identifier sub-module 220, graph generator sub-module 230, clustering sub-module 240, console sub-module 250, and a calculator sub-module 260. In alternative embodiments, the functionality of one or more of the sub-modules may be combined or divided.

As shown in FIG. 2, the analyzer module 200 may include a log file data sub-module 210. In some embodiments, the log file data sub-module 210 may record information associated with users accessing files stored in the network file system. For example, the log file data sub-module 210 may receive a stream of file accesses and create a log file or update a log file to include recent file accesses. In some embodiments, the log file may include an entry for each instance of a user accessing a file on the network file share. For example, an entry may be created each time that a user has accessed a single file. The entry may identify the user, the file that was accessed, the location of the file, the type of action that the user performed on the file (e.g., opened or read the file, edited or wrote to the file, copied the file, deleted the file, etc.), and/or the time when the user accessed the file. The log file data sub-module 210 may be a persistent storage unit. In some embodiments, a persistent storage unit may be a local storage unit or a remote storage unit. Persistent storage units may be a magnetic storage unit, optical storage unit, solid state storage unit, electronic storage units (main memory), or similar storage unit. Persistent storage units may be a monolithic device or a distributed set of devices. A 'set', as used herein, refers to any positive whole number of items. In some embodiments, the log file data sub-module 210 also includes information identifying user attributes of users who have accessed the network file system. Examples of user attributes include, but are not limited to, a business unit affiliation (e.g., engineering department, marketing department, etc.), job title, office location, etc.

The analyzer module 200 may include an identifier sub-module 220. In some embodiments, the identifier sub-module 220 may receive the file access information data (e.g., a log file) from the file data sub-module 210 and identify relationships or associations between users who have accessed files in the network file system. For example, the identifier sub-module 220 may process each entry in the log file to identify the files that each user has accessed. Once the files that each user has accessed are determined, such information may be used to identify which users have accessed the same or similar files. For example, if a first user and a second user have read or written to the same file or two different files under the same folder, then a relationship or association between the first user and the second user may be identified. As such, a common set of accessed files (e.g., the same file or similar files that are files under the same folder) may be identified for each pair of users. In some embodiments, files with similar contents may be referred to as similar files. For example, files with at least one common content object may be similar files. Examples of content objects include, but are not limited to, a graph, a paragraph of text, an image, etc. As such, in some embodiments, a first file under a first folder and a second file under a second folder may be similar files if each of the first file and the second file includes an identical content object.

As shown, the analyzer module 200 may include a graph generator sub-module 230. In some embodiments, the graph generator sub-module 230 may receive the identification information from the identifier sub-module 220 and create a graph representing the relationships or associations between the users. For example, the graph may represent the relationships or associations of pairs of users where each user of the pair has accessed a common set of files. As referred to herein, a common set of files may refer to either the same file and/or different files within the same folder. The graph may be considered a collaboration graph or collaboration information as it identifies relationships or associations between users who have each accessed at least one common file. Further details with regard to a graph that the graph generator sub-module 230 may generate or create are disclosed with relation to FIG. 4.

The analyzer module 200 may also include a calculator sub-module 260. In some embodiments, the calculator sub-module 260 may receive the graph from the graph generator sub-module 230 and/or the file log from the file data sub-module 210 and create weighted values (or weights) for each of the identified relationships or associations for the pairs of users that have accessed at least one common file or a set of common files. For example, relationships or associations between two users may be assigned a weighted value to represent a level of collaboration between the two users. As an example, a large number of common files being accessed by two users may indicate a high level of collaboration between the two users and result in a high weighted value and a small number of common files being accessed by two users may indicate a low level of collaboration and result in a low weighted value. Further details with regard to the calculation of weighted values associated with the graph are disclosed with relation to FIG. 4.

The analyzer module 200 may further include a clustering sub-module 240. In some embodiments, the clustering sub-module 240 may perform a hierarchical clustering function to the graph that is generated by the graph generator sub-module 230 and/or the graph after the weighted values have been calculated by the calculator sub-module 260. Examples of a hierarchical clustering that may be performed include, but are not limited to, a Clauset-Newman-Moore algorithm and a Wakita-Tsurumi algorithm. The hierarchical clustering may identify or derive communities or groups of collaborative users within the graph. For example, the hierarchical clustering may highlight or identify clusters or sub-graphs within the graph where users within a cluster or sub-graph are more closely related or associated and thus more closely collaborative as opposed to users that are not within the same cluster or sub-graph. For example, two users with a high weighted value calculated for their relationship or association may fall within the same cluster or sub-graph as the two users have collaborated on a larger set of common files. However, two users with a low weighted value for their relationship or association may not fall within the same cluster (e.g., the first user may be in a first cluster and the second user may be in a second cluster) as the two users have not collaborated on a large set of common files. Further details with regard to hierarchical clustering are disclosed with relation to FIG. 5.

As shown in FIG. 2, the analyzer module 200 may include a console sub-module 250. In some embodiments, the console sub-module 250 may cause to visually display or may create a visual representation of the graph with hierarchical clustering.

Figure 3:
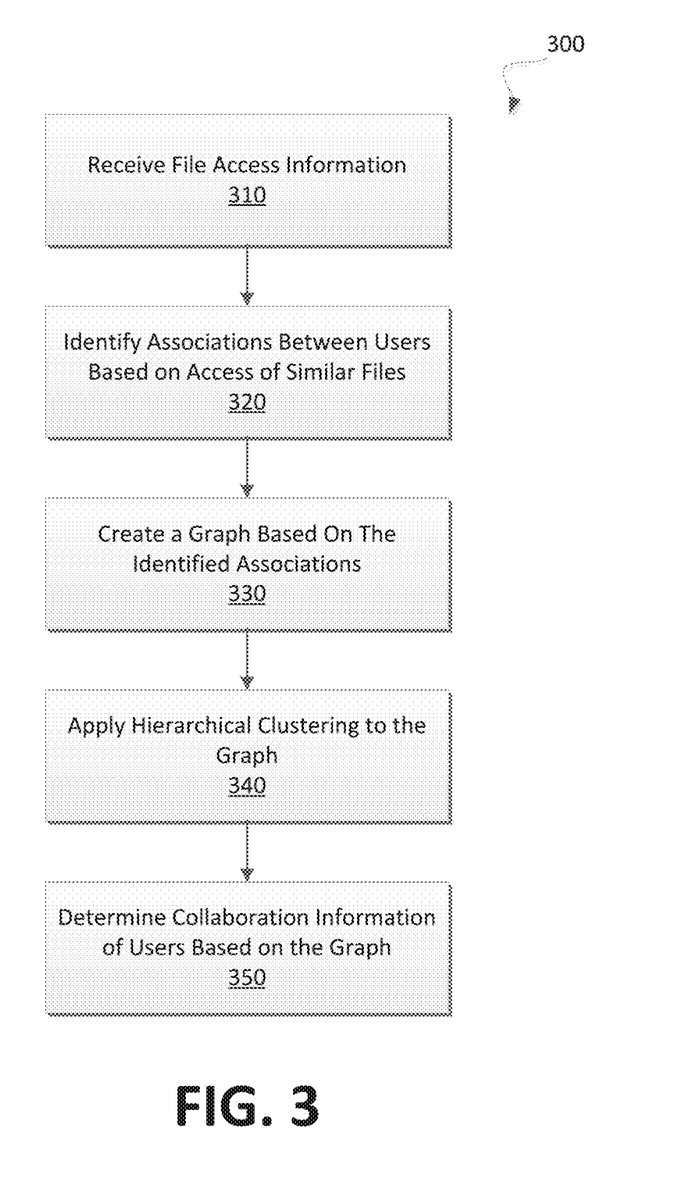
FIG. 3 is a flow diagram illustrating an example method to determine social or collaboration information from information associated with file accesses in accordance with some embodiments of the present disclosure.

FIG. 3 is a flow diagram illustrating an example method 300 to determine social or collaboration information from information associated with file accesses by users. The method 300 may be performed by processing logic that may comprise hardware (e.g., processing device, circuitry, dedicated logic, programmable logic, microcode, etc.), software (e.g., instructions run on a processing device), or a combination thereof. In some embodiments, the method 300 may be performed by an analyzing module 121 or 200 in a network administrator system 120 of FIG. 1.

As shown in FIG. 3, the method 300 may receive, at block 310, file access information associated with a network file system. For example, a log file comprising information identifying specific users that have accessed specific files may be received. At block 320, relationships or associations between users may be identified based on access of either the same file or files under the same folder or directory. For example, a relationship or association between two users may be identified if each of the users has accessed either the same or similar file. At block 330, a graph may be created based on the identified associations and, at block 340, hierarchical clustering may be performed on the graph. In some embodiments, the hierarchical clustering of the graph may result in clusters or groups of users who have a high level of collaboration with other users within the same cluster or group. At block 350, collaboration information of the users may be identified or determined based on the graph with hierarchical clustering.

Figure 4:
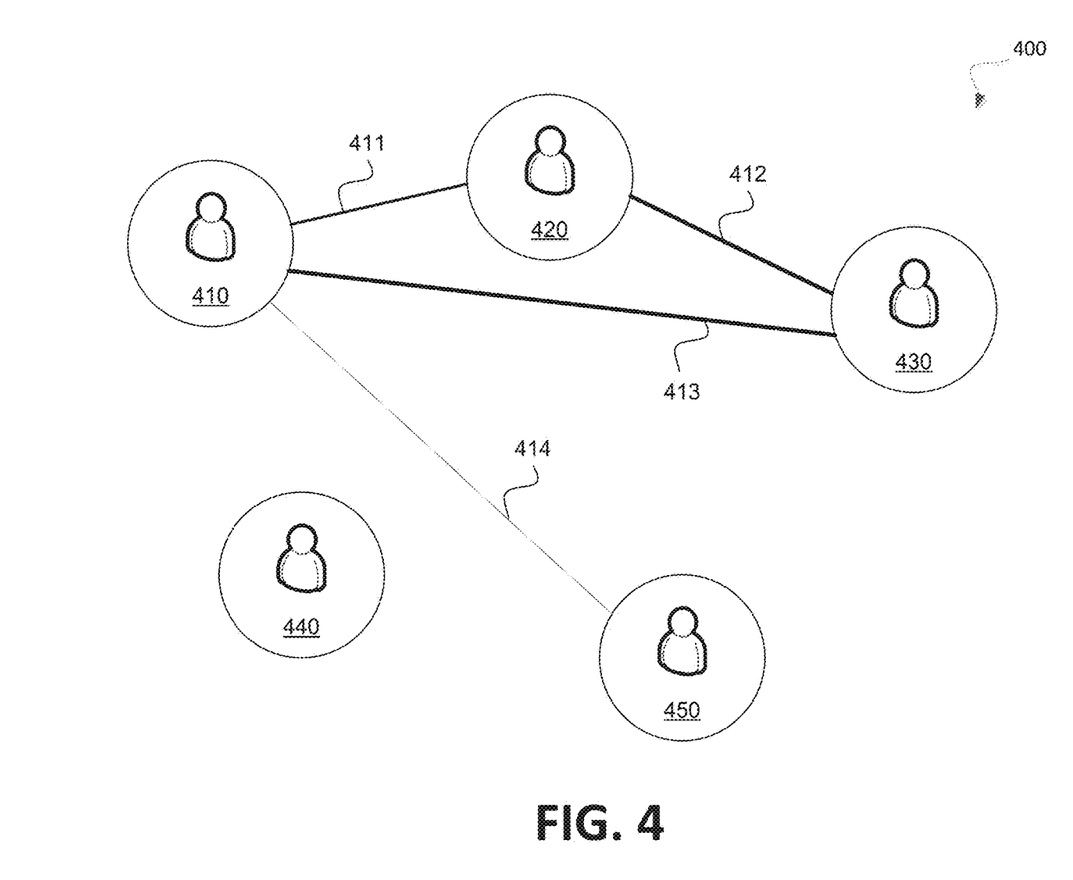
FIG. 4 is an illustration of an example graph showing social or collaboration information of users in accordance with some embodiments.

FIG. 4 is an illustration of an example graph 400 showing social and/or collaboration information of users. In general, the graph 400 may represent a social network analysis of users associated with a network file system (e.g., network file system 110). The graph 400 may be generated by the network administration system 120, analyzer module 121 or 200, and/or the graph generator sub-module 230 of FIGS. 1 and 2. In some embodiments, the graph 400 may be generated at block 330 of FIG. 3.

The graph 400 may be considered a representation of a set of vertices or objects referred to as nodes that are connected by links (e.g., common or similar file accesses between users) that may be referred to as edges. In some embodiments, the graph 400 may be an undirected graph where an edge has no orientation. For example, an edge in the graph 400 may be an association between two users. As such, the graph 400 may illustrate vertices or objects connected by links or edges that represent at least one user connected to at least another user based on common or similar file access associated with a network file system.

As shown in FIG. 4, the graph 400 may illustrate multiple user objects or nodes 410, 420, 430, 440, and 450. Each of the user objects or nodes 410, 420, 430, 440, and 450 represents and corresponds to a user who has accessed at least one file stored in a network file system. Furthermore, the graph 400 may illustrate multiple links 411, 412, 413, and 414. Each of the links 411, 412, 413, and 414 represents connections or associations between the users who have accessed at least one same or similar file in the network file system. For example, link 411 represents a relationship or association between user objects or nodes 410 and 420 and the link 411 represents that the user corresponding to user object or node 410 and the user corresponding to user object or node 420 have each accessed at least one similar or same file. Similarly, link 412 illustrates a relationship or association between user objects or nodes 420 and 430 representing that the user corresponding to the user object or node 420 has accessed at least one common (i.e., identical) or similar (e.g., under the same folder) as the user corresponding to user object or node 430. As such, the links 411, 412, 413, and 414 may represent an identification of pairs of users of the network file system where each user of the pair has accessed at least one same or similar file associated with the network file system.

In some embodiments, each of the links 411, 412, 413, and 414 may be associated with a weighted value or weight. The weighted value may be higher to represent a stronger relationship or association between users of a user pair or comparatively lower to represent a lower relationship or association between users of a user pair. Furthermore, the weighted value for the links may vary based on how the users have used a network file system. For example, the weighted value for each of the links may be calculated based on a frequency of file access for each user of a user pair connected with a link and/or a number of same or similar files (i.e., a common set of files) that have been accessed by each user of a user pair. As an example, the user corresponding to user node 430 and the user corresponding to the user node 420 may each have accessed many of the same or similar files. However, the user corresponding to the user node 450 and the user corresponding to the user node 410 may have not accessed many of the same or similar files. As a result, the link 412 between the user node 420 and the user node 430 may have an increased or higher weighted value when compared to the link 414 between the user node 410 and the user node 450.

In some embodiments, the weighted value for a link may also be calculated based on a type of file access associated with users of a user pair. For example, different types of file accesses or actions may result in a different weight value assigned to a link. Examples of types of file accesses or actions may include, but are not limited to, opening or reading a file, editing or writing to a file, creating a file, deleting a file, moving a file to another location (e.g., folder), copying a file, etc. In some embodiments, if both users of a user pair have edited or written to the same accessed file in the network file system, then the weight value for the link between the user nodes corresponding to the users may be increased or higher than if both of the users had only opened or read the file and did not edit or write to the file. Thus, a write access to a file may result in or contribute to a higher weight value than a read access to the file. In the same or alternative embodiments, the weight value may be calculated based on a frequency of access to the same or similar files by each user of a user pair.

Returning to FIG. 4, as shown, the user node 440 is not associated with any link. As such, the user corresponding to the user node 440 has no similar relationship or association with any other user of the network file share as represented by links 411, 412, 413, and 414. For example, the user corresponding to the user node 440 has accessed at least one file of the network file system, but no other user (e.g., users corresponding to user nodes 410, 420, 430, and 450) has accessed the same or a similar file that the user corresponding to user node 440 has accessed.

As such, a graph may be generated to illustrate a social analysis of users and files of a network file system. The graph may represent collaboration information between the users of the network file system. Each user who has accessed at least one file of the network file system may be represented in the graph. Furthermore, associations or relationships between the users may be identified by the graph. For example, a relationship may be identified if each user of a pair of users has accessed either the same file or a similar file of the network file system. A weight value may be calculated for each of the relationships based on how each user of a user pair has accessed or interacted with the same or similar files.

Figure 5:
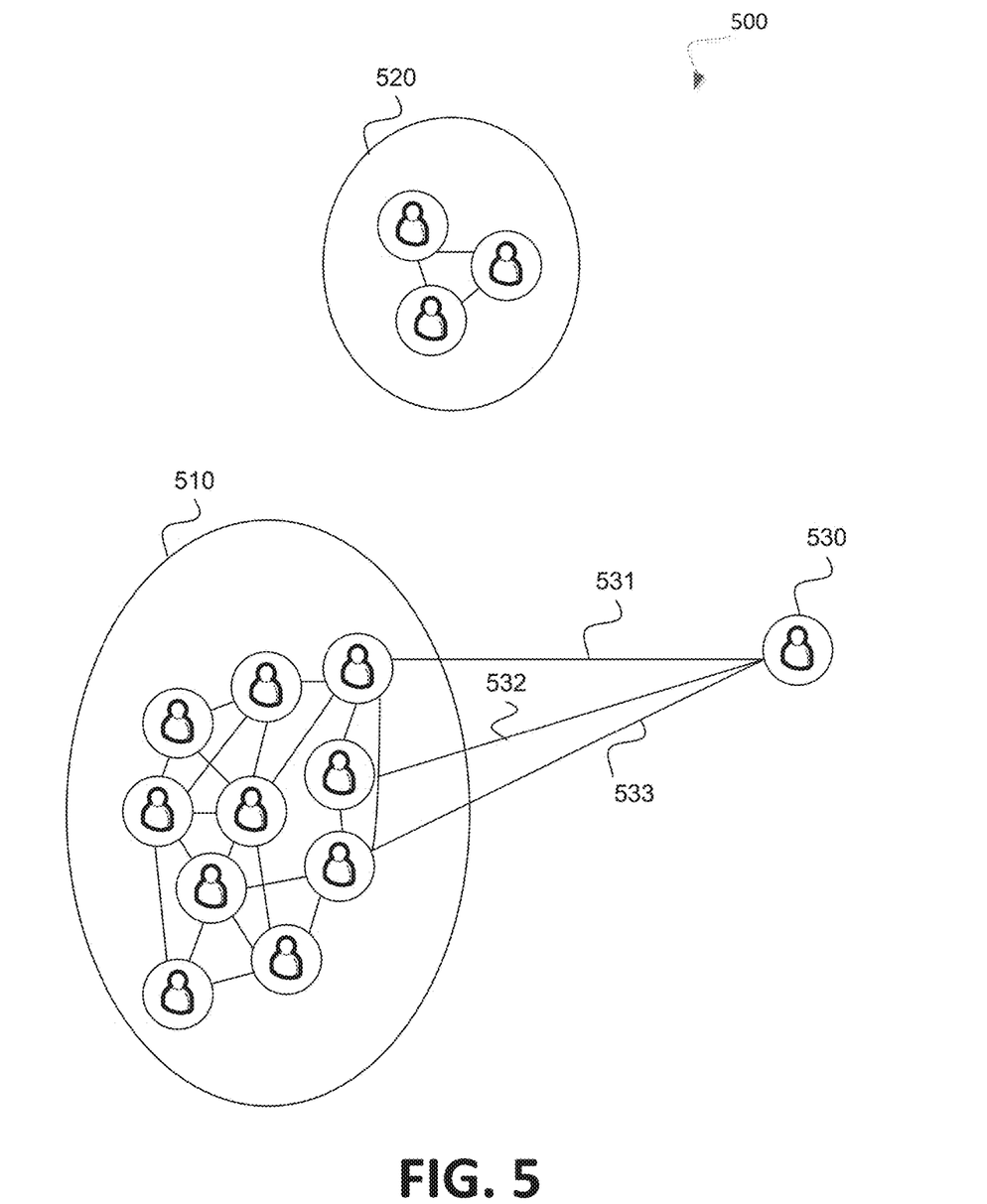
FIG. 5 is an illustration of an example graph with hierarchical clustering showing social or collaboration information of users in accordance with some embodiments of the present disclosure.

FIG. 5 is an illustration of an example graph 500 with hierarchical clustering showing social or collaboration information of users. In general, the graph 500 may correspond to the graph 400 after hierarchical clustering has been performed on the graph 400. The graph 500 may also represent a social network analysis of users associated with a network file share by showing collaborative groups of users and potentially outlier users who are accessing files accessed by the collaborative group but are not part of the collaborative group. The graph 500 may be generated by the network administration system 120, analyzer module 121 or 200, and/or the clustering sub-module 240 of FIGS. 1 and 2. In some embodiments, the graph 500 may be generated at block 340 of FIG. 3.

As shown in FIG. 5, the graph 500 may include clusters 510, 520, and 530. The graph 500 with clusters may be created by a graph rendering algorithm (e.g., the Fruchterman-Reingold algorithm) that places pairs of users within a cluster closer together as opposed to pairs of users within other clusters. In some embodiments, each of the clusters may represent a collaborative group of users. For example, users corresponding to user nodes within the cluster 510 may be more collaborative with other users within the cluster 510 as opposed to users within the cluster 520. The users may be assigned to a cluster based on the weight values assigned to the link representing the relationship or association between users. For example, users associated with links having high weight values with other users may be placed in a single cluster with the other users with which they have links with high weight values. For example, if a first user and a second user are associated with a high weight value link and if the first user and a third user are associated with a low weight value link while the third user and a fourth user are associated with a high weight value link, then the first user and the second user may be placed into a first cluster and the third user and the fourth user may be placed into a second cluster. As such, user nodes may be distributed within the clusters based on the weight values calculated for the links between the user nodes. As the weight values may be based on a frequency of access to the same or similar files, a number of same and/or similar files accessed, a type of access to the same and/or similar files, then the assigning or distributing of user nodes to clusters may be based on such factors.

Returning to FIG. 5, the clusters 510 and 520 may include multiple user nodes representing multiple users. For example, the cluster 510 may include ten user nodes representing ten highly collaborative users that are connected with high weight value links. As an example, the cluster 510 may represent an engineering group within a corporate enterprise. The ten users corresponding to the ten user nodes of the cluster 510 may be connected with high weight value links as the ten users are each editing, reading, or performing other file access actions on the same or similar engineering files on a network file system. Similarly, the cluster 520 and the three users corresponding to the three user nodes may be connected with high weight value links as the three users may be part of a marketing group within the corporate enterprise and are thus accessing the same or similar marketing files on the network file system.

As shown, the cluster 530 may only include a single user node corresponding to a single user. However, the user node within the cluster 530 may be accessing one or more files that users from the cluster 510 are accessing. For example, links 531, 532, and 533 may represent that the user from the cluster 530 is accessing files that multiple users from the cluster 510 are accessing. Such activity may represent anomalous or unauthorized file access behavior or unauthorized collaborative behavior as the user in the cluster 530 is not part of the cluster 510, but is accessing the same or similar files that users of the cluster 530 are accessing. Such behavior may indicate that the user in the cluster 530 may be a malicious insider within the corporate organization who is performing unauthorized file accesses.

As such, user nodes may be clustered within groups to represent a collaborative group of users who are accessing the same or similar files. Furthermore, links between user nodes of different clusters may represent anomalous or unauthorized file access behavior.

Figure 6:
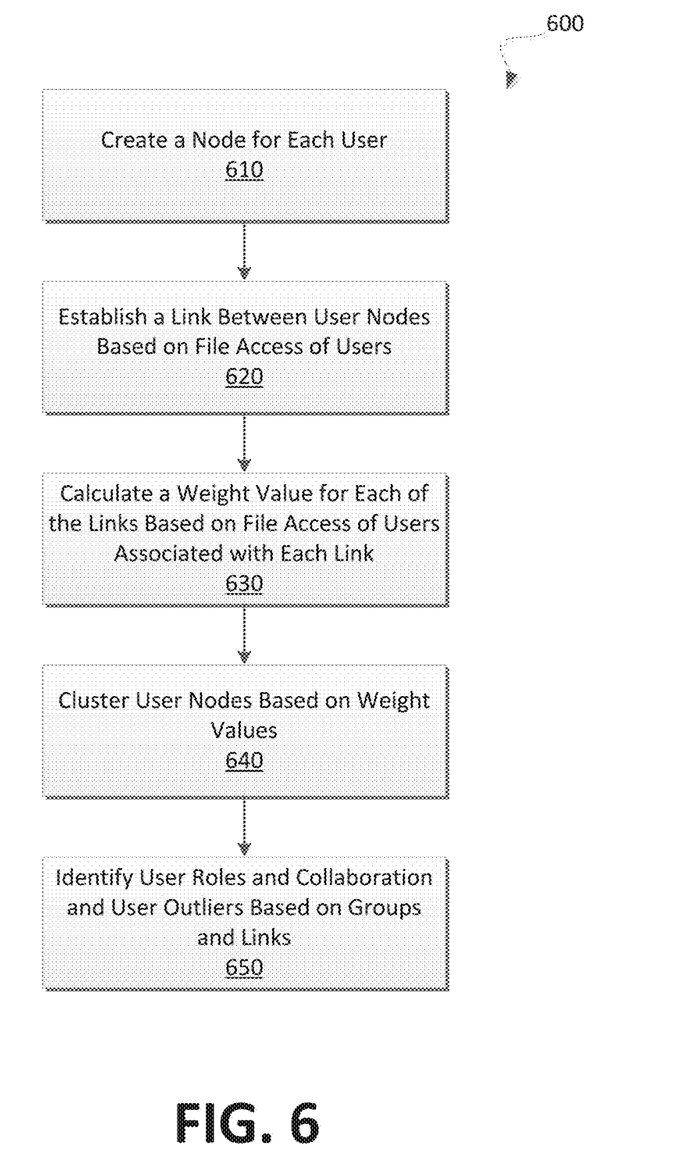
FIG. 6 is a flow diagram illustrating an example method for creating a graph and to determine social or collaboration information from the graph in accordance with some embodiments of the present disclosure.

FIG. 6 is a flow diagram illustrating an example method 600 to create a graph and to determine social or collaboration information from the graph. The method 600 may be performed by processing logic that may comprise hardware (e.g., processing device, circuitry, dedicated logic, programmable logic, microcode, etc.), software (e.g., instructions run on a processing device), or a combination thereof. In some embodiments, the method 600 may be performed by an analyzing module 121 or 200 in network administrator system 120 of FIG. 1.

As shown in FIG. 6, the method 600 may create, at block 610, a node for each user who has accessed at least one file on a network file system. At block 620, a link may be established between user nodes based on the file access of users. For example, a link may be created between any two user nodes when either of the two users corresponding to the user nodes has accessed at least one same or similar file on the network file system. At block 630, a weight value may be calculated for each of the links based on the file access of the users associated with each link. In some embodiments, the weight value may be calculated based on a frequency of access of a common set of files (e.g., the same files or similar files) of the users associated with the link. For example, if the one of the users or both of the users associated with a link frequently access one or more of a common set of files then the weight value may be higher as opposed to if the users do not frequently access one or more of the common set of files. In the same or alternative embodiments, the weight value may be calculated based on a number of files that are in the common set of files. The weight value may also be calculated based on the type of access that one or both users associated with a link perform on a file in the common set of files. For example, if both users write to the same or similar file, such an action may cause the weighted value to be calculated higher as opposed to both users only reading but not writing or editing the same or similar file. Similarly, if only one of the users writes to the file and the other user reads the file, the calculated weight value may be lower than if both of the users were writing to the file. As such, the weight value for a link may be calculated based on a frequency that each user accesses a file in the common set of files, the number of files in the common set of files, a type of file access performed by the users, etc.

At block 640, the user nodes may be grouped into one or more clusters based on the weight values for each of the links between the user nodes. For example, user nodes corresponding to users who access the same or similar files may be grouped into a cluster. Furthermore, at block 650, user roles and collaboration groups may be identified from the clustered user nodes. For example, users corresponding to user nodes in the same cluster may be identified as belonging to the same collaboration group as the users access the same or similar files. In some embodiments, each user node may also be associated with user attributes corresponding to a user. The user attribute may include demographic information, identification information, corporate information, or any other type of information to identify a user. Examples of user attributes may include, but are not limited to, the name of the user, job title of the user, the organization to which the user belongs (e.g., engineering, marketing, etc.), the office location of the user, etc. As such, if most of the users in a cluster are part of the same organization (e.g., engineering), then the files that the users in the cluster are accessing may also be considered engineering related files. However, if one of the users in the cluster is part of another organization (e.g., marketing) and is accessing the same or similar engineering files as the users in the engineering organization, then such activity may be identified. In some embodiments, the network administrator (e.g., of the network administrator system 120) may use the information of the clusters and the user demographics to assign user attributes to users. For example, in the above example, the user attribute for the user currently in the marketing organization may be reassigned to the engineering organization by changing the user attribute. As such, a bottom-up role mining process may be performed by using the clustered graph to identify the user roles based on the current file access behavior of users of a network file system and to reassign a user attribute based on the clustered graph. In some embodiments, the identification of a user node with attributes different than other user nodes within the same cluster may be highlighted or identified and displayed (e.g., by the console sub-module 250). For example, if most of the user nodes in a cluster have an engineering group user attribute and one of the user nodes has a marketing group user attribute, the user node with the marketing group user attribute may be highlighted and identified as a potential anomalous activity.

In some embodiments, identifying collaborative activity with multiple users accessing certain files or folders may be identified as anomalous or unauthorized file access activity. For example, certain folders (e.g., a home directory or home folder) may be intended to only be accessible by a single user. However, if the collaboration information identifies that two users have accessed the same home folder, then such activity may be identified as anomalous or unauthorized behavior. An alert may be issued to a network administrator to address the file permissions for the user with the anomalous behavior.

The collaboration information may provide additional useful data for a network administrator of a network file share. For example, the top collaborative file or folder on the network file system or the top collaborative file or folder of a particular cluster may be identified. In some embodiments, the top collaborative file or folder is identified based on the file or folder that has the most users accessing the file or files under the same folder. Anomalous user activity may be identified based on users with different user attributes accessing the same or similar files as other users with other user attributes or with multiple users accessing the same or similar files in a home folder intended to only be accessible to a single user. The clustering of the user nodes may allow the network administrator to view groups of users with similar user attributes and to reassign a user attribute to particular users based on the collaboration information. The collaboration information may also aid the network administrator to determine an optimal provisioning of file access permissions to users and thereby prevent over-exposure of files or too restrictive file access permissions causing operational difficulties to users of the network file system. For example, if a user is assigned to a cluster and is to be given file access permissions to another file or folder, then other users assigned to the same cluster and thus collaborate with the user may also need to be assigned the same file access permissions. As such, the network administrator may use the clustered graph to identify the other users who may be assigned the same file access permission as well. Similarly, if a first user and a second user are identified from the collaboration information to be collaborative users (e.g., there is a link with a high weighted value between the first and second user) and if the first user has recently accessed a file or folder and the second user has not accessed the file or folder in quite some time, the network administrator may be advised to not deactivate or remove the file access permissions for the second user to the file or folder as the second user may collaborate with the first user on the file or folder at a later point in time despite currently being inactive and not having accessed in some time the file or folder.

Figure 7:
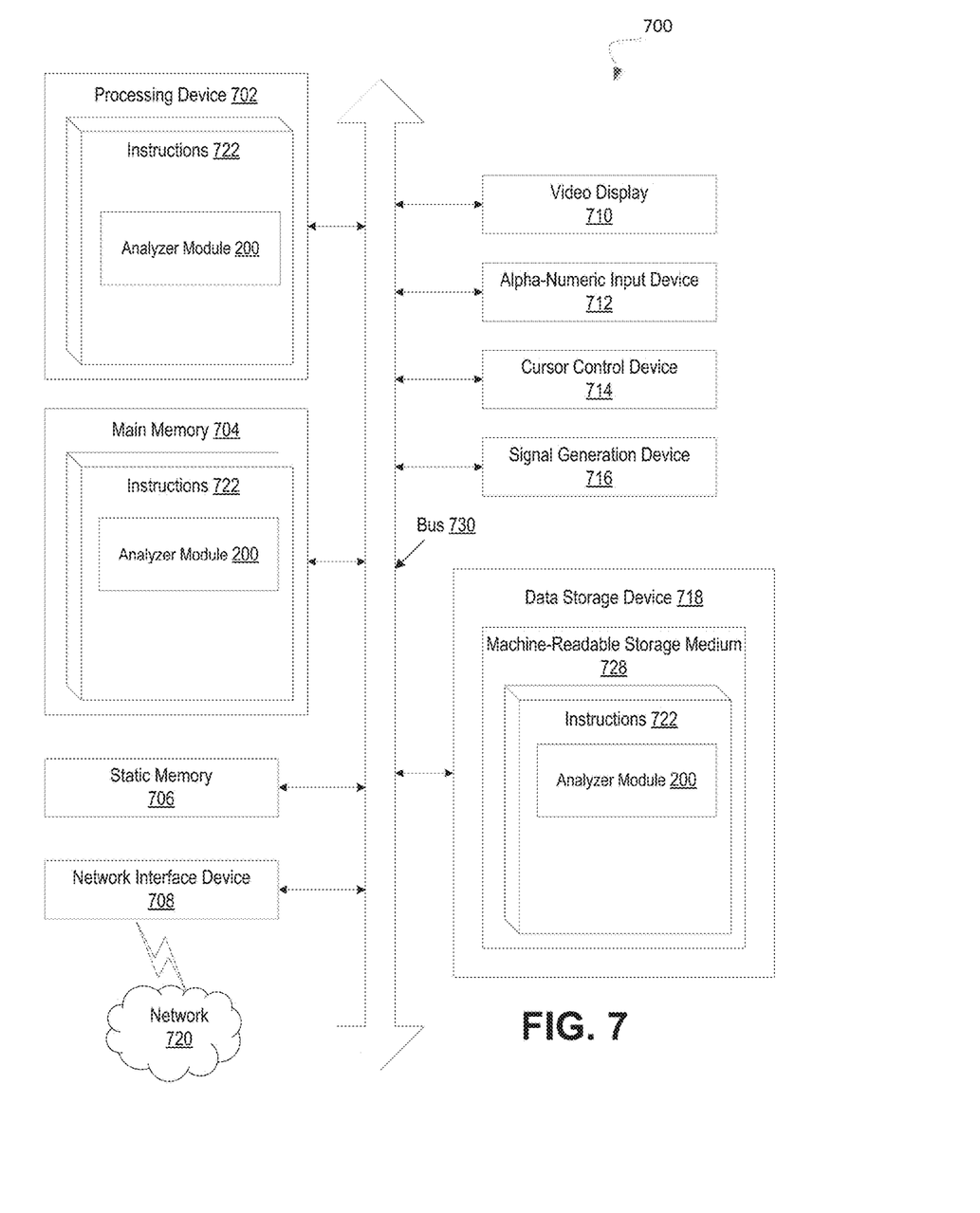
FIG. 7 is a block diagram of an example computer system that may perform one or more of the operations described herein.

FIG. 7 illustrates an example machine of a computer system 700 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or DRAM (RDRAM), etc.), a static memory 706 (e.g., flash memory, static random access memory (SRAM), etc.), and a data storage device 718, which communicate with each other via a bus 730.

Processing device 702 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. The processing device 702 is configured to execute instructions 722 for performing the operations and steps discussed herein.

The computer system 700 may further include a network interface device 708. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The data storage device 718 may include a machine-readable storage medium 728 (also known as a computer-readable medium) on which is stored one or more sets of instructions or software 722 embodying any one or more of the methodologies or functions described herein. The instructions 722 may also reside, completely or at least partially, within the main memory 704 and/or within the processing device 702 during execution thereof by the computer system 700, the main memory 704 and the processing device 702 also constituting machine-readable storage media.

In one implementation, the instructions 722 include instructions for an analyzer module (e.g., analyzer module 121 of FIG. 1 and/or analyzer module 200 of FIG. 2) and/or a software library containing methods that call modules or sub-modules in an analyzer module. While the machine-readable storage medium 728 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method of managing a network file system, comprising:
   receiving file access information identifying a plurality of users and a plurality of files, stored in the network file system, that have been accessed by at least one of the users;
   identifying pairs of users of the plurality of users based on each user of each pair accessing at least one same file of the plurality of files;
   establishing links between nodes based at least in part upon file access of the users, wherein each node corresponds to one of the users and each link connects two of the nodes corresponding to users of each identified pair of users;
   calculating, by a processing device, a weight value for each link based on a number of same files that have been accessed by users associated with each link and a type of access that users associated with each link perform on the number of same files;
   determining collaboration information associated with the users based on the weight value for each of the identified pairs of users, wherein the collaboration information identifies user roles and collaborative groups of users accessing related files of the network file system; and
   generating a display, to manage the network file system, of the collaboration information to perform at least one of provisioning of file access privileges of the network file system based on the identified collaborative groups and identifying anomalous activity on the network file system based on the identified collaborative groups.

2. The method of claim 1, wherein the identifying of the pairs of users is further based on each user of the pair accessing at least one file under a same folder.

3. The method of claim 1, wherein the calculating of the weight value for each of the identified pairs is further based on a frequency of access of the at least one same file by each user of each identified pair.

4. The method of claim 1,
   wherein generating a display comprises generating a graph to represent the collaboration information, wherein the graph comprises a plurality of nodes and links.

5. The method of claim 4, further comprising:
   clustering the nodes of the graph into a plurality of groups based on the weight value for each of the identified pairs and the links between the nodes corresponding to users of each of the identified pairs of users and using the clustered nodes to perform at least one operation to manage operation of the network file system.

6. The method of claim 5, further comprising:
   identifying collaborative groups of users based on the nodes clustered into the groups; and determining at least one of a provisioning of file access privileges based on the identified collaborative groups and identifying anomalous activity on the network file system based on the identified collaborative groups.

7. The method of claim 1, wherein the calculating of the weight value for each of the identified pairs of users is further based on a type of access to the at least one same file by each user of the identified pair of users, a write access to the at least one same file results in a higher weight value than a read access to the at least one same file.

8. A system comprising:
   a memory; and
   a processing device coupled with the memory to:
      receive file access information identifying a plurality of users and a plurality of files, stored in a network file system, that have been accessed by at least one of the users;
      identify pairs of users of the plurality of users based on each user of each pair accessing at least one same file of the plurality of files;
      establish links between nodes based at least in part upon file access of the users, wherein each node corresponds to one of the users and each link connects two of the nodes corresponding to users of each identified pair of users;

calculate a weight value for each link based on a number of same files that have been accessed by users associated with each link and a type of access that users associated with each link perform on the number of same files; and determine collaboration information associated with the users based on the weight value for each of the identified pairs of users, wherein the collaboration information identifies user roles and collaborative groups of users accessing related files of the network file system;

generate a display, to manage the network file system, of the collaboration information to perform at least one of provisioning of file access privileges of the network file system based on the identified collaborative groups and identifying anomalous activity on the network file system based on the identified collaborative groups.

9. The system of claim 8, wherein the identifying of the pairs of users is further based on each user of the pair accessing at least one file under a same folder.

10. The system of claim 8, wherein the calculating of the weight value for each of the identified pairs is further based on a frequency of access of the at least one same file by each user of each identified pair.

11. The system of claim 8,
wherein the generate a display comprises generate a graph to represent the collaboration information, wherein the graph comprises a plurality of nodes and links.

12. The system of claim 11, wherein the processing device is further to:
cluster the nodes of the graph into a plurality of groups based on the weight value for each of the identified pairs and the links between the nodes corresponding to users of each of the identified pairs of users and using the clustered nodes to perform at least one operation to manage operation of the enterprise network file system.

13. The system of claim 12, wherein the processing device is further to:
identify collaborative groups of users based on the nodes clustered into the groups; and
determine at least one of a provisioning of file access privileges based on the identified collaborative groups and identify anomalous activity on the network file system based on the identified collaborative groups.

14. The system of claim 8, wherein the calculating of the weight value for each of the identified pairs of users is further based on a type of access to the at least one same file by each user of the identified pair of users, a write access to the at least one same file results in a higher weight value than a read access to the at least one same file.

15. A non-transitory computer readable storage medium including instructions that, when executed by a processing device, cause the processing device to perform operations comprising:
receiving file access information identifying a plurality of users and a plurality of files, stored in a network file system, that have been accessed by at least one of the users;

identifying pairs of users of the plurality of users based on each user of each pair accessing at least one same file of the plurality of files;

establishing links between nodes based at least in part upon file access of the users, wherein each node corresponds to one of the users and each link connects two of the nodes corresponding to users of each identified pair of users;

calculating a weight value for each link based on a number of same files that have been accessed by users associated with each link and a type of access that users associated with each link perform on the number of same files; and determining collaboration information associated with the users based on the weight value for each of the identified pairs of users, wherein the collaboration information identifies user roles and collaborative groups of users accessing related files of the network file system;

generating a display, to manage the network file system, of the collaboration information to perform at least one of provisioning of file access privileges of the network file system based on the identified collaborative groups and identifying anomalous activity on the network file system based on the identified collaborative groups.

16. The non-transitory computer readable storage medium of claim 15, wherein the identifying of the pairs of users is further based on each user of the pair accessing at least one file under a same folder.

17. The non-transitory computer readable storage medium of claim 15, wherein the calculating of the weight value for each of the identified pairs is further based on a frequency of access of the at least one same file by each user of each identified pair.

18. The non-transitory computer readable storage medium of claim 15, wherein the operations further comprise:
generating a graph to represent the collaboration information, wherein the graph comprises a plurality of nodes and links.

19. The non-transitory computer readable storage medium of claim 18, wherein the operations further comprise:
clustering the nodes of the graph into a plurality of collaborative groups of users based on the weight value for each of the identified pairs and the links between the nodes corresponding to users of each of the identified pairs of users and determining at least one of a provisioning of file access privileges based on the identified collaborative groups and identifying anomalous activity on the network file system based on the identified collaborative groups.

20. The non-transitory computer readable storage medium of claim 15, wherein the calculating of the weight value for each of the identified pairs of users is further based on a type of access to the at least one same file by each user of the identified pair of users, a write access to the at least one same file results in a higher weight value than a read access to the at least one same file.

* * * * *